Patented Feb. 20, 1940

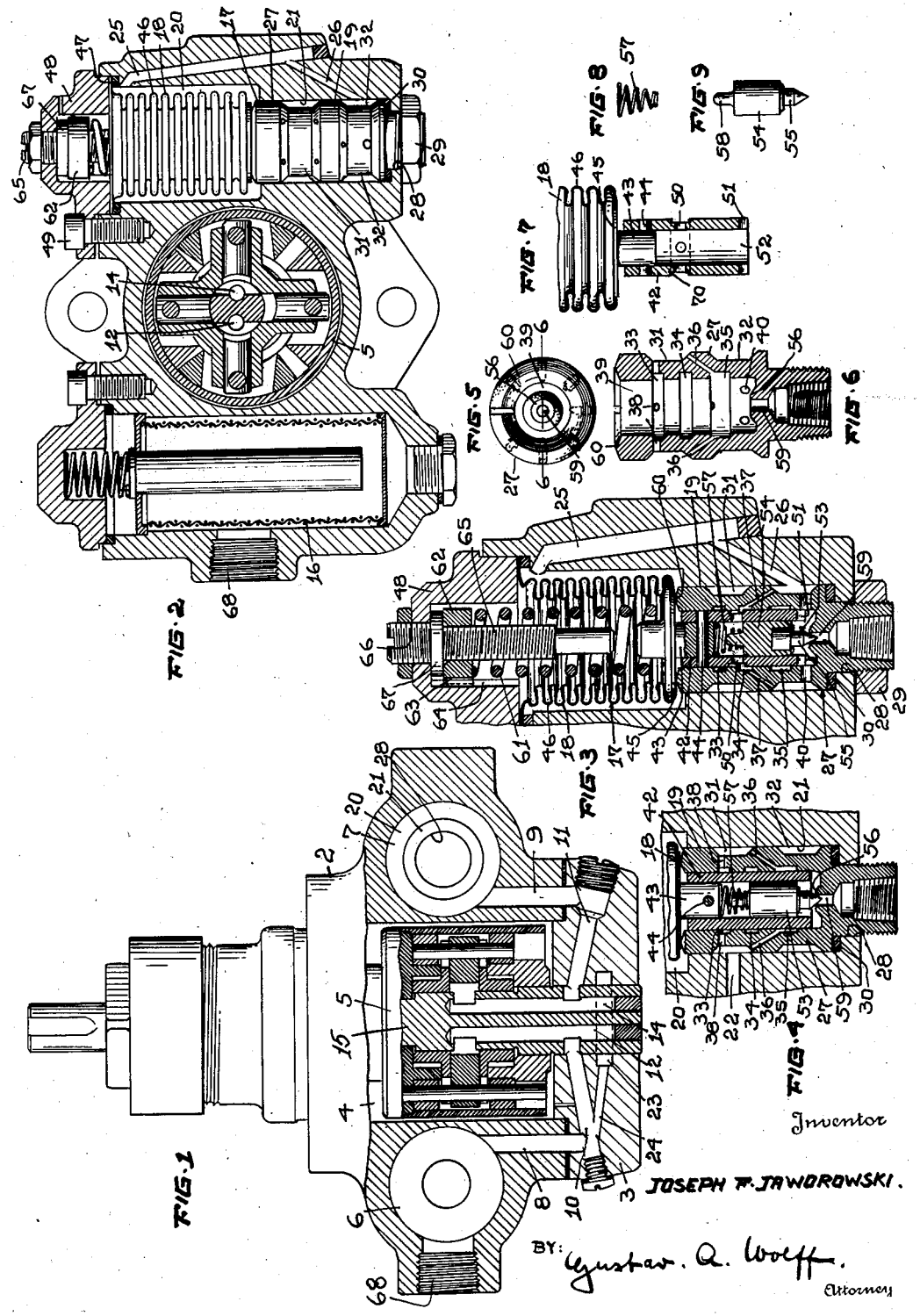

2,191,319

UNITED STATES PATENT OFFICE 2,191,319

PRESSURE REGULATING VALVE

Joseph F. Jaworowski, Cleveland, Ohio, assignor of twenty-five one-hundredths to Sam W. Emerson, Cleveland, Ohio Application May 14, 1937, Serial No. 142,542

8 Claims. (Cl. 137—153)

This invention relates in general to valves and more particularly to pressure regulating valves particularly adapted to be used in connection with fuel supply units for oil burners or the like.

Presently known pressure regulating valves generally embody pressure responsive diaphragms or bellows actuating the shiftable valve portions of these valves. These diaphragms are exposed to fluid under pressure and their movements are subject to counteracting spring pressures in order to retard opening movements of the valve portions until the pressure of the fluid in the valve is sufficient to effect desired results, for example, proper vaporizing of liquid fuel fed to the nozzle of an oil burner etc. However, pressure regulating valves of this type actuate their shiftable valve portions rather slowly, particularly the opening and closing of these valves, therefore proper results cannot be obtained. For example, a pressure regulating valve of this type when used for controlling the fuel supply of an oil burner feeds insufficient fuel to the burner nozzle during opening and/or closing movements of the valve. This is due to the fact that during opening and closing movements of the valve the cross section of its outlet opening is substantially restricted, causing at the nozzle formation of uncombustible fuel vapor mixtures, leakage of oil, etc.

It is the primary object of the present invention to provide a pressure regulating valve having snap-like acting shiftable valve portions, which portions are adapted to effect instantaneous opening and/or closing of the valve at predetermined pressures.

Another object of the invention is the provision of a pressure regulating valve with pressure operated, snap-like acting, shiftable valve portions adapted to effect instantaneous opening and/or closing of the valve at predetermined pressures.

A further object of the invention is the provision of a pressure regulating valve embodying a valved outlet port, a valved by-pass port, pressure operated means for opening and closing said by-pass port and independent pressure actuated valve means for instantaneously fully opening and/or fully closing said outlet port, said means being controlled by said opening and closing means for said by-pass port to effect actuation of said independent means in predetermined positions of said valve means for said by-pass port.

Still another object of the invention is the provision of a pressure regulating valve of the type referred to above of simple and sturdy construction embodying an outlet, and pressure controlled independent snap-like shiftable valve means for opening and closing said outlet.

With these and incidental objects in view, the invention consists in certain novel features of construction and combination of parts, the essential elements of which are set forth in the appended claims; and a preferred form of embodiment of the invention is hereinafter shown with reference to the drawing accompanying and forming a part of this specification.

In the drawing:

Fig. 1 is a plan view of a rotary pump embodying a valve chamber for mounting a pressure regulating valve therein.

Fig. 2 is a cross sectional view through the pump shown in Fig. 1 having arranged in its valve chamber a pressure regulating valve according to the invention.

Fig. 3 is a somewhat enlarged fragmentary longitudinal sectional view through the pressure regulating valve shown in elevation in Fig. 2.

Fig. 4 is a fragmentary sectional view similar to Fig. 3 through the pressure regulating valve, however, the section being offset 45° with respect to the section shown in Fig. 3, to disclose all bores in the valve housing of the pressure regulating valve.

Fig. 5 is a plan view of the valve housing and Fig. 6 a sectional view of the valve housing, the section being taken on line 6—6 of Fig. 5.

Fig. 7 is a sectional view through the tubular piston member of the pressure regulating valve having attached thereto operating bellows.

Fig. 8 is a side view of the spring member yieldingly seating the independent outlet valve, and Fig. 9 is a side view of the independent outlet valve.

Referring now more particularly to the drawing, which illustrates a practical embodiment of my invention, I have shown my pressure regulating valve in connection with a rotary pump unit such as described in my co-pending application Ser. No. 102,473, filed September 25, 1936. This pump unit embodies a casing 2 closed at its open end by means of a closure plate 3 and formed with a central cylindrical chamber 4 enclosing a rotary pump unit 5. Casing 2 in addition has arranged therein two elongated chambers 6 and 7 substantially symmetrically arranged with respect to each other, which chambers are in communication with the intake and outlet sides of the pump unit 5 by means of passages 8 and 9 in casing 2, passages 10 and 11 in closure plate 3 and bores 12 and 14 in the stud shaft 15 of the pump unit 5. Chamber 6 which is connected to the intake or suction side of the pump unit carries a screen member 16 and chamber 7 which is connected to the outlet or pressure side of the pump unit has mounted therein a pressure regulating valve 17 embodying a pressure responsive portion 18 and a valve mechanism 19. The pressure responsive portion 18 of valve 17 is arranged in the upper chamber portion 20 of chamber 7, which chamber portion communicates with the pressure side of the pump unit through passages 9, 11 and bore 14, and the valve mechanism 19 of said valve is mounted in the lower chamber portion 21 of chamber 7, which chamber portion 21 communicates at its upper part with the suction side of the pump unit through a passage 22 (see Fig. 4), a circular channel 23 in closure plate 3, which channel communicates with said passage 23 (not shown), and a passage 24 entering into passage 16.

Liquid drawn from chamber 6 into the pump unit 5 through passages 8, 10 and bore 12 is discharged under pressure from said unit through bore 14, and passages 9 and 11 into the upper chamber portion 20 of the chamber 7, from where such liquid is discharged through a bore 25 at the top of said portion and a bore 26 into the lower part of the lower chamber portion 21, which latter chamber portion seats the valve mechanism 19 of the pressure regulating valve 17.

The valve mechanism 19 includes a stationary, screw-machined, chambered cylindrical piston valve housing 27, extended through an opening 28 in the bottom wall of chamber 7 and rigidly clamped and sealed to said wall by means of a nut member 29 and a sealing washer 30. This piston valve housing has its outside wall circumferentially recessed to form two paralleled outer circular grooves 31 and 32, spaced from each other and in alignment with passages 22 and bore 26 respectively and has its inner wall recessed to form three parallel circular grooves 33, 34 and 35. The outer groove 31 communicates through angular bores 36 with the inner groove 35 and outer groove 32 communicates through angular bores 37 with the inner groove 34. In addition, outer groove 31 communicates with inner groove 33 by means of straight bores 38, and outer groove 32 communicates with the chamber 39 of the housing through bores 40, all for a purpose later to be described.

The piston valve housing 27 extends from the lower chamber portion 21 slightly into the upper chamber portion 20 and has slidably arranged in its chamber 39 a bellows operated tubular piston valve member 42, sleeved upon a valve supporting rod 43 and rigidly attached thereto by means of a pin 44. This valve supporting rod extends downwardly from the bottom disc 45 of bellows 46, the upper end of which bellows is seated upon a circular shoulder 47 at the top of the upper chamber portion 20 and is tightly sealed and clamped to said shoulder by means of a recessed cover plate 48 secured to the casing 2 by means of cap screws 49.

Piston valve member 42 which is provided with a plurality of cross bores 50 arranged in its upper portion and slotted at its lower edge as at 51 slidably mounts in its central passage 52 a spring pressed valve member 53 embodying a cylindrical body 54 carrying a valve 55 which is rigidly secured to said body. The valve member 53 is yieldingly forced into sealing engagement with a valve seat 56 by means of a helical spring 57, seated against rod 43 and a finger-like extension 58 on body 54, which valve seat 56 is formed at the bottom of chamber 39 in housing 27 around an outlet passage 59 at the bottom of the chamber 39 and thus prohibits escape of liquid from the lower chamber portion 21 through the outlet passage 59, when the bottom disc 45 of bellows 46 is yieldingly forced into engagement with the circular knife edge 60 of the valve housing 27 by means of a spring 61 centrally arranged within the bellows 46 and seated against the inner face of the disc 45 and a vertically shiftable adjusting nut member 62. This nut member embodies a groove 63 engaging with a rib 64 on the inner wall of the recessed cover plate 48 and will be vertically shifted on a threaded stem 65 when said stem is rotated in one or the other direction. The stem 65 extends upwardly through a central perforation 66 in the cover plate 48 and a collar 67 on said stem engaging the inner wall of said cover plate permits of the stem being freely rotated until the desired tension of the spring is effected. The exposed threaded end of stem 65 carries a lock nut to permit of the stem being rigidly clamped to the cover plate in any adjusted position of nut member 62.

In operation of the pump unit embodying the pressure regulating valve according to the invention liquid is drawn into chamber 7 through opening 68 and then through passages 8, 10 and bore 12 into the pump unit 5 from where the liquid is forcibly discharged through bore 14 and passages 9 and 11 into the upper chamber portion 20 of chamber 7, further through bores 25 and 26 discharged into the lower chamber portion 21 and finally discharged into the inner chamber 39 of housing 27 through circular groove 32 and bores 40. Liquid discharge from chamber 39 can be effected through outlet passage 59, however, this outlet passage is controlled by the valve member 53 and cannot be opened until the piston valve member 42 is lifted to a predetermined position by means of the bellows 46.

Valve member 53, which, as previously stated, is yieldingly forced upon its seat 56 by means of the spring 57 is opened at predetermined pressures with a snap-like action. This action is caused as follows: At all pressures in chamber 20 which are lower than the predetermined pressure, the top and bottom faces of the valve member 53 are exposed to equal pressure, because liquid enters from upper chamber portion 20 into the chambers 39 and the chamber 52 below the valve member 53 through bores 25, 26, circular groove 32 and bore 40; and liquid also enters into the chamber 52 above the valve member 53 through angular bores 36, groove 34 and groove 70 with cross bores 50. However, as soon as the pressure in the upper chamber portion 20 has risen to the predetermined rate, the part of chamber 52 above the valve member 53 is brought into communication with the suction side of the pump, whereby the pressure on the top face of the valve member 53 is sharply reduced and permits of the valve member 53 being upwardly shifted with snap-like action against the force of the spring 57 by the pressure of the liquid in the part of chamber 52 below the valve member 53. This snap-like shifting of the valve member 53 fully opens the outlet passage 59. Should the fluid pressure in upper chamber portion 20 drop below the predetemined pressure, then the communication of the part of chamber 52 above the valve member 53 with the suction side of the pump is shut off and thereafter this part of the chamber 52 is brought into communication with the pressure side of the pump so that the top and bottom faces of the valve member 53 are exposed to the same pressure and permit of the valve member 53 being shifted downwardly by the pressure of the spring 57 with snap-like action, thus fully and suddenly closing the outlet passage 59.

The movements of the valve member 53 are fully controlled by the bellows operated piston valve member 42. Thus, when the pressure of the liquid in the upper chamber 20 rises, then the bellows 46 are compressed against the force of the spring 61 and effect upward movement of the piston valve member 42 until the communication of circular channel 70 and cross bores 50 with the pressure side of the pump is shut off, and, then said channel 70 and the cross bores 50 are brought into communication with the inner upper groove 33 of the valve housing and permit of the liquid in the part of chamber 52 above the valve member 53 being discharged into the suction side of the pump through grooves 33, bores 38, outer groove 31, passage 22, circular channel 23, passages 24 and 10, and bore 12. Under these conditions the pressure of the liquid in the part of chamber 52 below the valve member 53 effects upward shifting of said valve member with a snap-like action to its open position. When the pressure of the liquid drops below the predetermined rate, then the spring 61 forces the bellows operated piston valve member 42 downwardly, which shifting effects shutting off of the communication of the part of chamber 52 above the valve member 53 with the suction side of the pump, and thereafter communication of said part of the chamber 52 with the pressure side of the pump through angular passages 37, so that the pressure of the liquid upon the top and bottom faces of the valve member 53 is equalized and permits of the said valve member being shifted with a snap-like action to its closed position by the force of the spring 57.

It should be noted that the circular groove 70 in the piston valve member 42 is narrower than the distance between the grooves 33 and 34 so as to prevent communication between the suction and pressure sides of the pressure regulating valve.

Excessive pressures of the liquid to be dispensed are avoided by by-passing part of the liquid, should the pressure rise beyond a predetermined rate. Thus, at a predetermined pressure, chamber 39 is brought into communication with the intake side of the pump unit 5 by means of the inner groove 35, angular bores 37, outer groove 32, passage 22, circular channel 23, passages 24 and 10, and bore 12. This possible communication of the chamber 35 with the intake side of the pump unit 5 is controlled by the pressure actuated piston valve member 42, which member covers the inner groove 35 at pressures below the predetermined rate and exposes said groove at a predetermined pressure slightly higher than the pressure necessary to effect the snap-like action for opening the valve member 35.

The above described arrangement permits of by-passing of a part of the liquid entering under pressure into the upper chamber 20 and thus provides controlling means for automatically regulating the volume and the pressure of the liquid discharged from the pump into the regulating valve and thereafter discharged from the chamber 39 of said regulating valve through its outlet passage 59.

Having thus described my invention, what I claim is:

1. A pressure regulating valve embodying a body including a pressure chamber having an inlet, an outlet and a pressure release passage, a slidable pressure actuated chambered valve member within the chamber of said body adapted to control said pressure release passage, a spring pressed piston-like valve snugly fitted and slidably arranged within the chamber of said valve member adapted to control said outlet passage, and passage means in said body and said pressure actuated valve member co-operating with said pressure release passage in suddenly effecting substantial pressure differences at the opposite sides of said spring-pressed piston-like valve and therewith snap-like shifting of said valve, when said pressure actuated valve member has been shifted to a predetermined position.

2. A pressure regulating valve as described in claim 1, wherein the piston-like valve snugly fits an axial bore in said pressure actuated valve member, and wherein said passage means in said predetermined position of said pressure actuated valve member connect the inner end of said bore with said pressure release passage and wherein other passage means are provided to connect in another predetermined position said inner end of said bore with said pressure chamber.

3. A pressure regulating valve comprising a chambered body having a pressure chamber and a valve chamber in communication with each other, outlet and by-pass means in said valve chamber, valve means in said valve chamber, and pressure responsive means in said pressure chamber actuating said valve means, said valve means including a tubular, stationary valve body snugly fitted in said chamber and provided with spaced, outer and inner, circular recesses in communication with said by-pass means and said pressure chamber, a tubular, piston like valve member coupled with said pressure responsive means controlling said inner recesses, passages in the side wall of said tubular valve member, a piston valve controlling the outlet means of said valve chamber shiftably arranged in said tubular valve member, and a spring yieldingly seating said piston valve on said outlet means, said piston valve being opened by the differential pressures on its opposite faces when the said pressure responsive means have shifted said tubular piston like valve member to a predetermined position.

4. A pressure regulating valve as described in claim 3, wherein said stationary tubular body in said valve chamber embodies two outer and three inner circular recesses, wherein two of said inner recesses are in communication with the outer recess, which communicates with the bypass means, and wherein the third inner recess communicates with the outer recess, which communicates with the pressure chamber, so as to permit of the central passage in said tubular member being coupled with the said by-pass means and the said pressure chamber.

5. A pressure regulating valve comprising a pressure chamber having outlet and release ports, and a valve unit in said chamber, said unit embodying a shiftable, pressure actuated means, a cylinder chamber in said pressure actuated means, a piston valve member in said cylinder chamber snugly slidably fitted therein and freely slidably extended into said pressure chamber in alignment with said outlet port, spring means forcing said piston valve member into engagement with said outlet port for closing same, passage means controlled by said pressure actuated means connecting said cylinder chamber with said pressure chamber, other passage means controlled by said pressure actuated means connecting said cylinder chamber with said release port, said cylinder chamber being normally in communication with said pressure chamber and said pressure actuated means being adapted to effect at predetermined pressures cutting off of the communication of said cylinder chamber with said pressure chamber and at increased pressures establish communication of said cylinder chamber with said release port to bring about sudden shifting of said piston valve member by differential pressures on its opposite faces for sudden opening of said outlet port at said increased pressures.

6. In a pressure regulating valve a pressure chamber having outlet and pressure release ports, and a valve unit in said pressure chamber controlling said ports, said valve unit embodying a shiftable pressure actuated chambered valve member, a spring pressed piston valve snugly slidably arranged within the chamber of said valve member and freely slidably extending therefrom opposite said outlet port for closing same, said piston valve forming an individual sub-chamber in the chamber of said pressure actuated valve member and fluid-tightly separating said sub-chamber from said pressure chamber, passage means controlled by said pressure actuated chambered valve member connecting said sub-chamber with the pressure chamber, other passage means spaced from said first passage means and controlled by said pressure actuated chambered valve member connecting said sub-chamber with said pressure release port, said sub-chamber being normally in communication with said pressure chamber so as to effect closing of said outlet port by said spring pressed piston valve and said pressure actuated chambered valve member being adapted to effect at predetermined pressures cutting off of the communication of said sub-chamber with said pressure chamber and at increased pressures established communication of said sub-chamber with said release port to bring about sudden shifting of said piston valve by differential pressures on its opposite faces and therewith sudden opening of said outlet port at said increased pressures.

7. In a pressure regulating valve such as described in claim 5 controlled passaged means directly connecting said release port with said pressure chamber, said passaged means being controlled by said pressure actuated means and effecting control of the pressure in said pressure chamber when the pressure therein has been built up to a predetermined rate.

8. In a pressure regulating valve the combination of a supporting body formed with a pressure chamber having inlet, outlet and pressure release passages, a freely shiftable, spring-pressed outlet valve controlling said outlet passage, a tubular, pressure responsive, shiftable valve for the pressure release passage shiftably and fluid tightly mounting said outlet valve in its tubular chamber and forming a sub-chamber therein, and passage means controlled by said tubular valve for connecting at predetermined pressures said sub-chamber with the inlet and/or the pressure release passage of said supporting body, said pressure chamber having rigidly seated therein a tubular body having spaced, inner and outer circular recesses, and wherein the tubular valve is slidably supported in said tubular body for controlling the inner recesses in said tubular body and the communication of the chamber in said tubular valve with the inlet and/or pressure release passage of said supporting body.

JOSEPH F. JAWOROWSKI.